Figure 10:
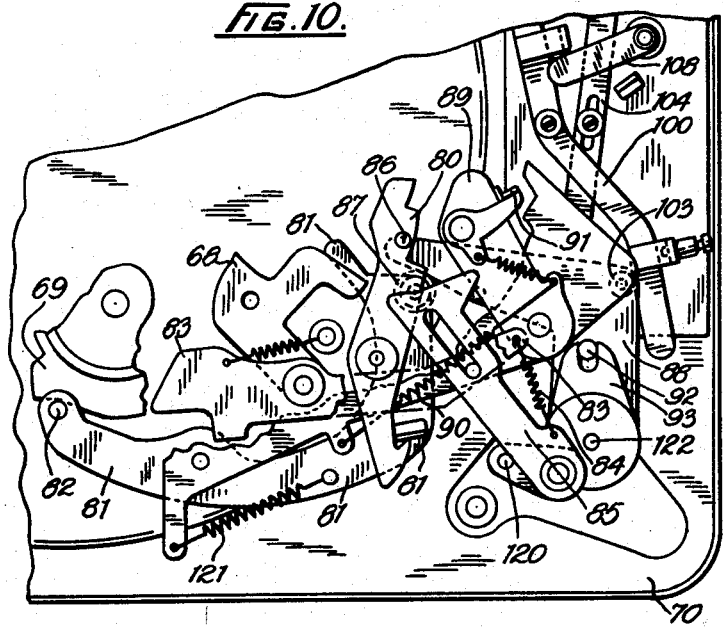

Feb. 16, 1960        H. SILBERMANN        2,925,280
RECORD-CHANGING APPARATUS FOR PHONOGRAPHS
Filed July 10, 1956        6 Sheets-Sheet 1
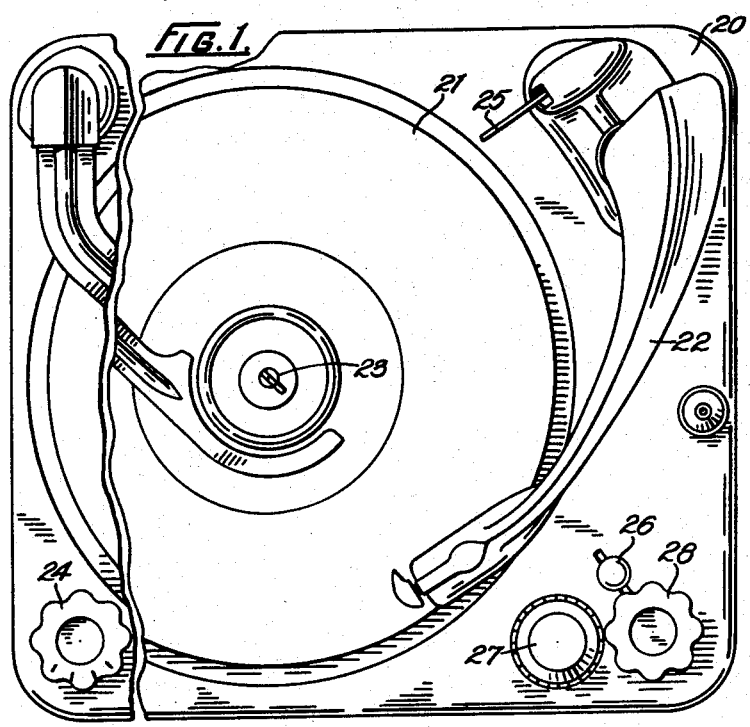
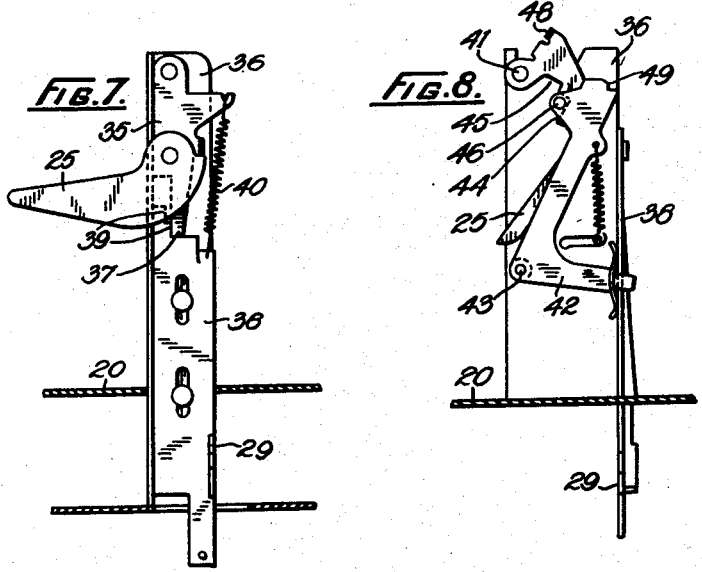
INVENTOR
HERBERT SILBERMANN
By Young, Emery & Thompson
ATTYS.

Feb. 16, 1960 H. SILBERMANN 2,925,280
RECORD-CHANGING APPARATUS FOR PHONOGRAPHS
Filed July 10, 1956 6 Sheets-Sheet 2
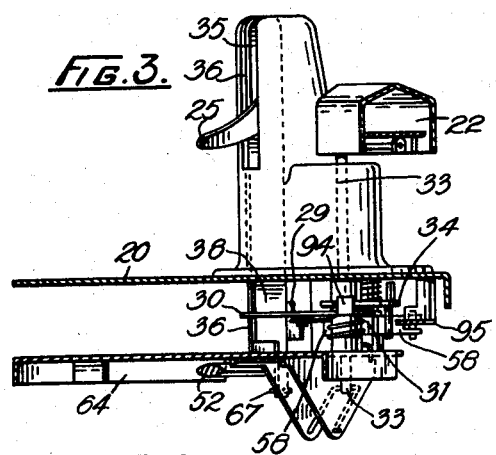
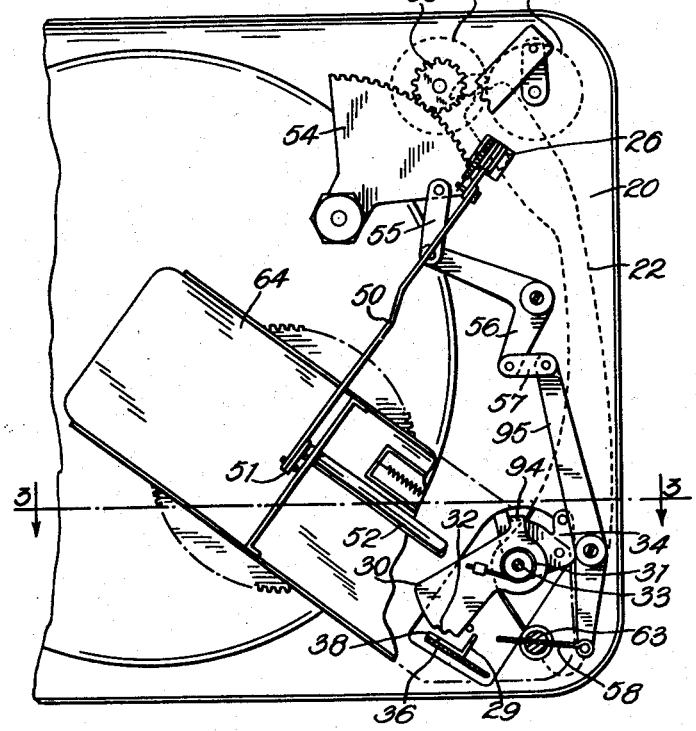
INVENTOR
HERBERT SILBERMANN
ATTYS.

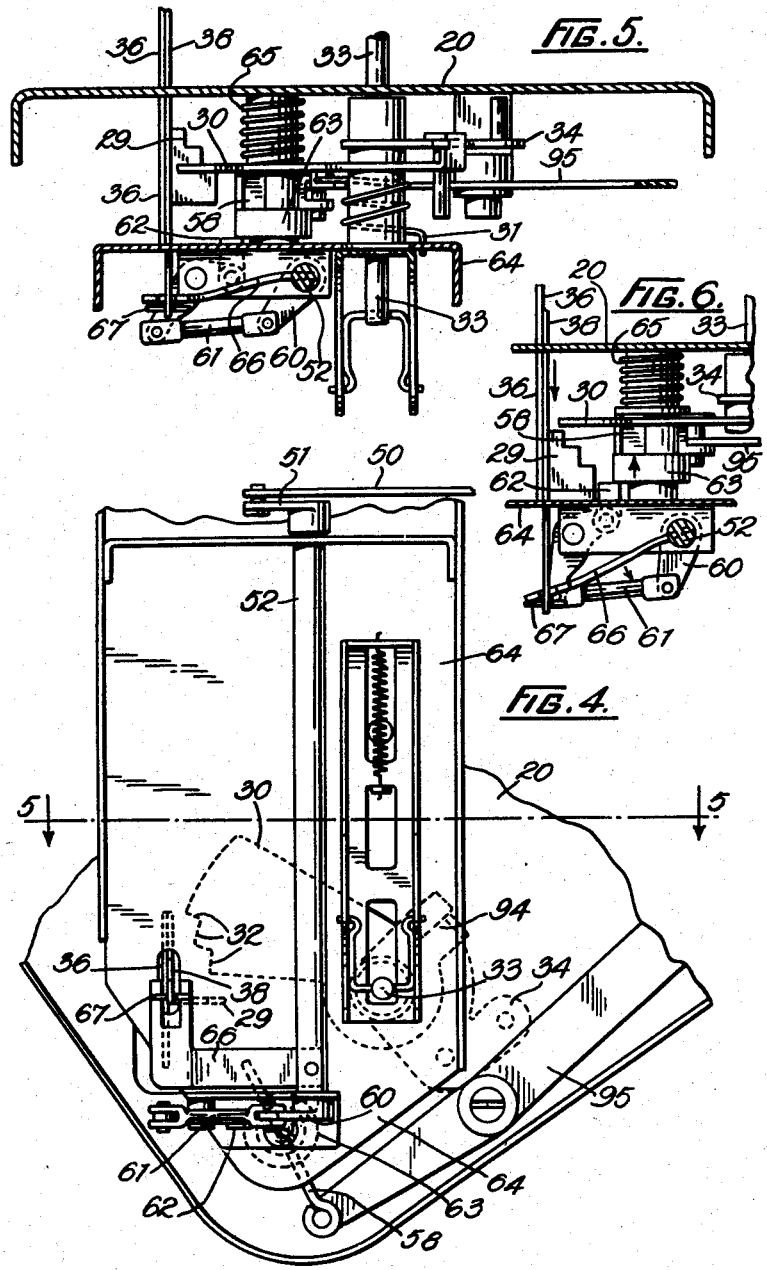

Feb. 16, 1960 H. SILBERMANN 2,925,280
RECORD-CHANGING APPARATUS FOR PHONOGRAPHS
Filed July 10, 1956 6 Sheets-Sheet 4

INVENTOR
HERBERT SILBERMANN
BY Young, Emery & Thompson
ATTYS

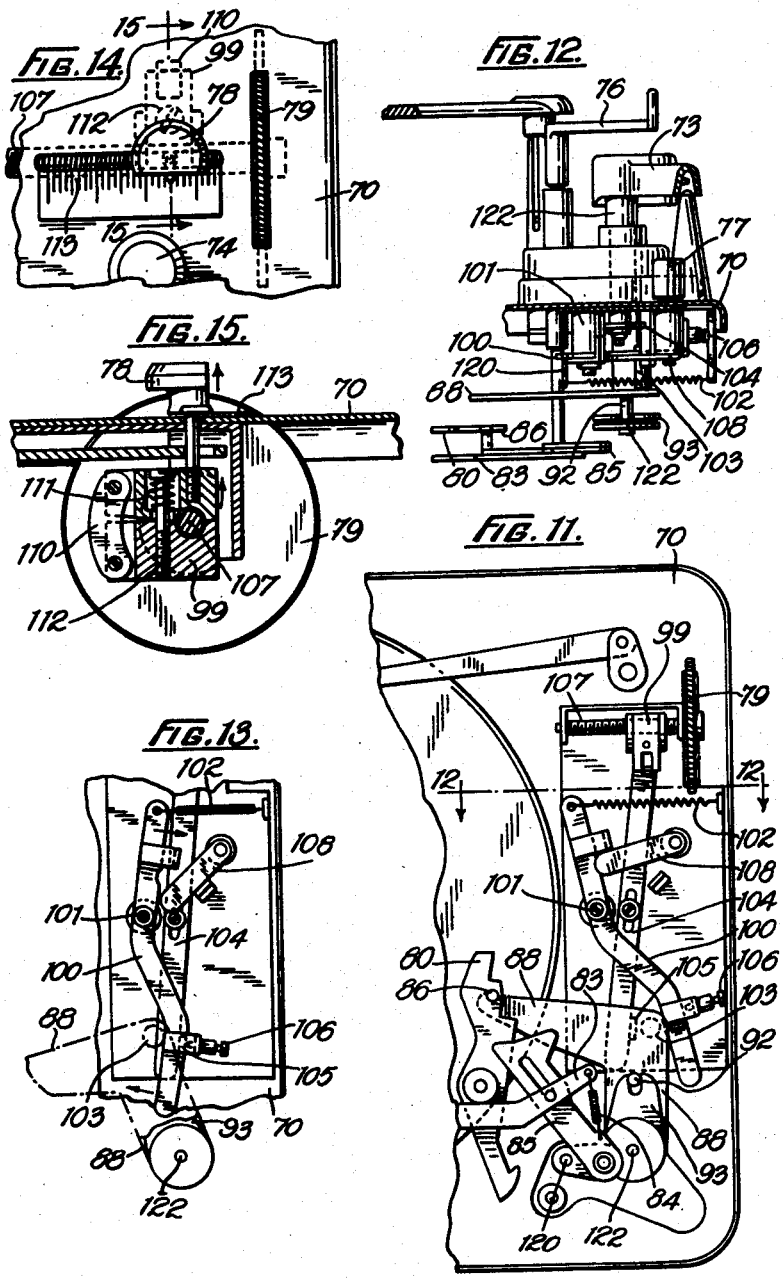

Feb. 16, 1960 H. SILBERMANN 2,925,280
RECORD-CHANGING APPARATUS FOR PHONOGRAPHS
Filed July 10, 1956 6 Sheets-Sheet 6
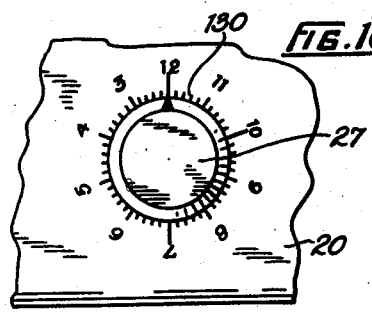
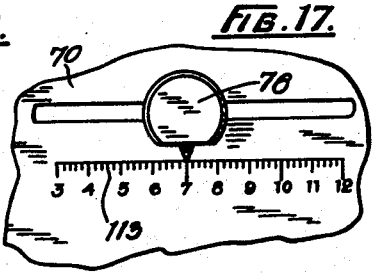
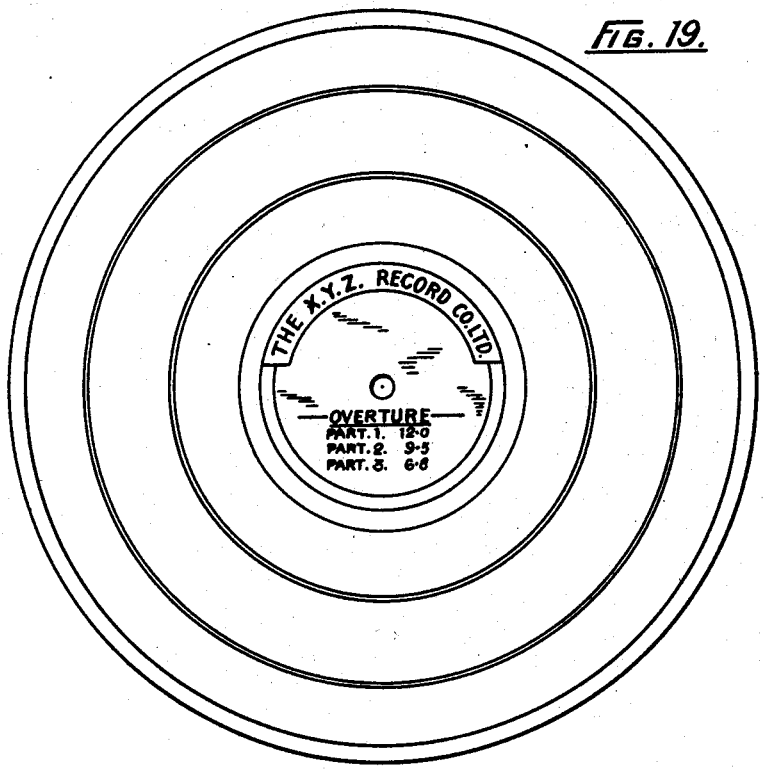
INVENTOR
HERBERT SILBERMANN
By Young, Emery & Thompson
ATTYS.

United States Patent Office  2,925,280
Patented Feb. 16, 1960

2,925,280

RECORD-CHANGING APPARATUS FOR PHONOGRAPHS

Herbert Silbermann and George Goch, Transvaal, Union of South Africa

Application July 10, 1956, Serial No. 596,877

Claims priority, application Union of South Africa July 10, 1955

11 Claims. (Cl. 274—10)

This invention relates to record playing apparatus for phonographs. While the invention is to be discussed primarily with reference to automatic record changers, it is not restricted to that field, but applies equally to such record players as are designed to play one record only at a time.

The primary utility which the changer of the invention is designed to offer is to enable a passage in a record to be selected more accurately than by the hit-and-miss methods necessary with existing apparatus. Such apparatus includes an indexing means which governs the radial distance at which the needle is offered to the record. In a changer made to deal with records of uniform diameter that distance is invariable. In the so-called "mixer" changers the distance, depending as it does on the diameter of the records, varies with the diameter, and is automatically set by the record itself. It is always the case, however, that the means operates merely to select the starting point of the records.

According to the invention, the means is capable of being preset to select any radial distance or any one of many radial distances.

It will be appreciated that the ability to preset the indexing means to a radial distance smaller than the starting distance enables a passage in a record to be accurately selected, provided only that the index figure of the passage be known either by prior trial or by an instruction from the record maker.

The invention further provides that the existing devices whereby the diameter of a record automatically governs the radial distance at which the tone arm is lowered to the turntable is unmodified, so that the changer can be used in precisely the same manner as the conventional changer. There is added to the changer, however, an adjustable means which constitutes a stop with which the lever actuating the tone arm makes contact to halt the tone arm in a position for lowering on to the record. The existing device is inhibited either by rendering at least part of the device inoperative or by subordinating the existing device to the action of the indexing means of the invention.

Figure 9:
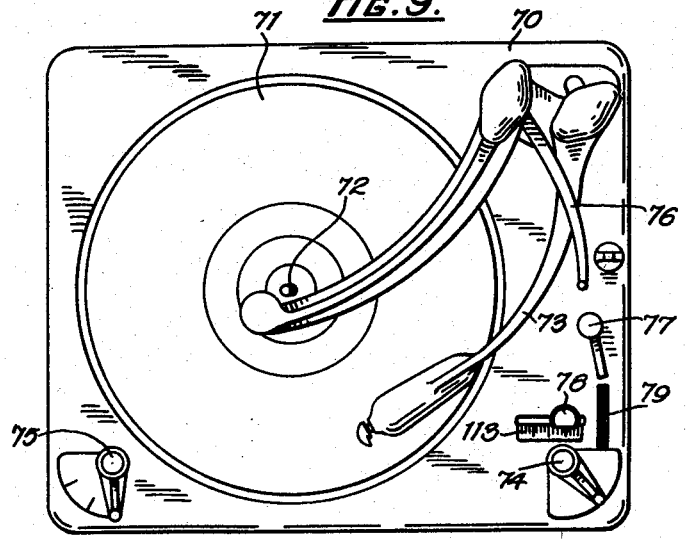

The invention is further discussed below with reference to the two embodiments that are illustrated in the accompanying drawings, in which Figure 1 is a plan view of an automatic "mixer" changer, Figure 2 is an underplan of the changer of Figure 1 showing the parts relevant to the present invention, Figure 3 is a sectional view along the line 3—3 of Figure 2, Figure 4 is a fragmentary underplan similar to Figure 2 on an enlarged scale, Figure 5 is a sectional view on the line 5—5 of Figure 4, Figure 6 is a view similar to Figure 5 with the parts constrained to a different position, Figure 7 is a side elevation of the stop mechanism of the mixer, Figure 8 is a view similar to Figure 7 of an alternative construction, Figure 9 is a plan view of the second embodiment of the invention, Figure 10 is a fragmentary underplan of the changer of Figure 9 showing parts relevant to the invention, Figure 11 is another fragmentary underplan, Figure 12 is a sectional view on the line 12—12 in Figure 11, Figure 13 is a fragmentary view showing parts of Figure 11 in a different position, Figure 14 is an enlarged plan view of the adjustment control of the invention, Figure 15 is a section on the line 15—15 of Figure 14, Figure 16 is an enlarged detail of a control knob used with the embodiment of Figures 1 to 8, Figure 17 is an enlarged detail of the control scale used with the embodiment of Figures 9 to 15, Figure 18 is a view of a gauge according to the invention, and Figure 19 is a view of a record according to the invention.

The machine illustrated in Figures 1 to 7 is of the mixer changer type and its known parts are substantially identical with those of a machine sold under the trademark "Monarch" by Birmingham Sound Reproducers Limited.

The changer shown in Figure 1, in broad outline comprises a turntable board 20, a turntable 21, a tone arm 22 (which carries the needle), a record spindle 23, a speed change control knob 24, an operating control knob 28 and a record indexing finger 25. Superficially the only parts added on to Figure 1 by the present invention are a clutch knob 26 and a passage selecting control knob 27.

Without the passage selecting control knob in action and with known parts performing their known functions, the operation of the changer is as follows. Firstly a stack of records of mixed sizes, in this case 7, 10 or 12 inches are put on the spindle 23 and the knob 28 is operated to start the changer. The spindle automatically releases a record and drops it on to the turntable. In dropping, the record, if it is of the two larger sizes stated, depresses the finger 25. The latter sets one of three abutments 29. At the same time the tone arm is automatically lifted from its position of rest and is constrained to rotate by a plate 30 which is acted upon by a torsion spring 31. The plate 30 has three detents 32 which may engage on that one of the three abutments 29 which had been preset in its way. When a detent 32 engages with an abutment 29 the movement of the tone arm is arrested until it is automatically lowered by known means on to the record on the turntable 21. Thereafter the tone arm moves forward under the action of the record, lost motion is provided between the tone arm spindle 33 and the plate 30 by a projection 94 on the latter engaging in a notched plate 34 rigid with the spindle 33.

When the end of a record is reached the tone arm is automatically raised and all parts reset to their initial position. In this initial position the one abutment 29 is always set in the path of that notch 32 which will stop the tone arm at the start of a 7-inch record. The cycle described now commences again by the dropping of a further record from the stack.

The finger 25 may set the abutments 29 in the manner described in British patent specification No. 693,594 and illustrated in Figure 7, i.e. the finger 25 is pivoted on a lever 35 pivoted on a fixed upright 36 and the lever 35 has an end 37 which engages in either of three notches 39 on a sliding plate 38, the plate being biased towards the pivot of the lever 35, by means of a spring 40 between an arm on the lever 35 and the plate 38. The latter provides the abutments 29.

Alternatively the finger 25 may set the abutments in the manner used on a record changer sold under the trade name "Collaro." In this case (see Figure 8) the finger 25 is pivoted on the upright 36 at 41 and pivoted on a bell crank 42 which in turn is pivoted on the upright 36 at 43. Notches 44 or 45 engage on a pin 46 on the bell crank which actuates a sliding plate 38 carrying the abutments 29. In the reset or 7-inch position a projection 48 on the finger 25 engages on a shoulder 49 on the bell crank.

The structure thus far described is very well known. The essence of such structure is that the tone arm 22 always moves to the beginning of a record of a given size.

The structure of the invention is provided in addition to the known structure to enable the tone arm to be set to a preselected position on a record which is to be dropped on to the turntable.

The first item is the clutching mechanism. This consists in a clutch knob 26 which on being moved actuates a lever 50 which is connected to a crank arm 51 on a shaft 52 (Figure 2). The second item is the control mechanism which comprises a knob 27 which on the underside of the board 20 carries a cog wheel 53 (Figure 2). This wheel 53 engages in a toothed quadrant 54 which is pivoted on the board. A lever 55 connects the quadrant 54 to a bell crank 56 pivoted on the board 20. A short lever 57 connects the crank 56 to a lever 95 also pivoted on the board. At its free end the lever 95 carries a pivoted sliding abutment 58 with lost motion in the vertical direction. The position of the abutment 58 in the path of the plate 30 may be adjusted in plan view by turning the knob 27.

In the normal cycle of operations the abutment 58 will in elevation be in the position shown in Figure 5, i.e. it is below the path of the plate 30. On operating the clutch the shaft 52 is rotated and a crank 60 on its free end through a lever 61 operates a jack stop 62 which elevates an abutment guide 63. The guide 63 is rotably mounted between the board 20 and a fixed plate 64, and is downwardly biased by means of a compression spring 65. The shaft 52 also carries an arm 66 which is bent at 90 degrees in plan and forked to straddle an extension of the plate 38. On rotation of the shaft 52 the forked portion of the arm engages on a cross pin 67 and pulls the plate 38 down into the position shown in Figure 6, i.e. the abutments 29 are now out of the path of the plate 30. At the same time the abutment 58 is now in the path of the plate 30.

When a record is now dropped on to the turntable, the finger 25 is not actuated as it has been pulled out of the way by lowering the plate 38. However the cycle of operations proceeds normally excepting that movement of the tone arm before it is lowered is only arrested when the plate 38 contacts the abutment 58. By moving the clutch knob 26 in an opposite sense the position shown in Figure 5 is restored and further records may be played normally.

While one record is being played the knob 28 may be preset to a given passage on the following record provided that the abutment 58 is not moved to a position beyond that at which the tone arm is at that moment.

Basically the second embodiment (Figure 9 onwards) also consists in known structure. Changers embodying this structure are sold as "Garrard Models R.C. 110, R.C. 111 and R.C. 120." The changer illustrated has a turntable board 70, a turntable 71, a record spindle 72, a tone arm 73, an operating control knob 74, a speed change control knob 75 and a record selector arm 76.

The structure which has been added by the invention to Figure 9 comprises a clutch knob 77 and an indexing shift 78. In addition a knurled wheel 79 provides finer adjustment of the shift 78.

Dealing first with the known structure, the changer has a main cam (part of which is shown in Figure 10 as 69) which triggers and stops several operations during the changing cycle. Only such operations as are relevant to the present invention will be discussed. After the control knob 74 has been put to the "on" position, the turntable commences to rotate and then the cam comes into operation. The first independent operation triggered by the cam is the release of a frictionally held stop lever 80 by means of a lever 81 which at one end has a cam follower 82. Thereafter means to lift the tone arm is triggered and the tone arm is lifted ready for rotation.

In the next operation the cam moves a lever 68 which in turn sets the abutment lever 80 to a position to accommodate the largest sized record for which the changer is designed. Thereafter the cam actuates a lever 83 which through a spring 84 pulls a lever 85 connected to the spindle 120 of the selector arm 76 until the selector arm engages on the edge of the record to be played.

The spring 84 relaxes to allow lever 83 to be moved to its maximum extent by the cam. The lever 85 pushes a pin 86 on the abutment lever 80 so that when the selector arm 76 engages a record the abutment lever 80 is indexed to one of three positions depending on the size of the records on the spindle 72. The record is now caused to drop by the cam actuating the spindle 72.

The cam follower 82 now enters a depression in the cam and the lever 81 under the action of a spring 121 is allowed to pivot so as to remove a roller 87 from the path of a tone arm plate 88. The latter is acted upon by a lever 89 which is constrained to move by a tension spring 90. As soon as a resilient stop 91 on the lever 89 abuts against the abutment lever 80 further movement of the tone arm is arrested and on further rotation of the cam the tone arm is lowered on to the record.

The changer also has known means (not shown) to return the tone arm to the starting position and to reset all levers to their initial positions.

The position at which the tone arm is lowered depends primarily on the setting of the abutment lever 80 (see Figure 10). After the lever 89 abuts against the lever 80, the tone arm plate moves on under the influence of the record grooves to complete the cycle. The plate 88 is connected to the spindle 122 of the tone arm by means of a slotted plate 93 on the spindle and a pin 92 to allow for lost motion during lifting and lowering of the tone arm.

The additional structure provided by the invention takes advantage of the lost motion between the lever 89 and the plate 88. In effect a second lever is caused to act on the plate 88 and carry on movement of the plate 88 up to a predetermined setting after the normal record setting has been reached. The structure to effect this is mainly shown in Figures 11 and 13.

An additional lever 100 is pivoted on the board 70 on a pin 101. One end of the lever 100 is acted upon by a tension spring 102. The other end is adapted to engage with a roller 103 on the plate 88.

A further lever 104 is slidably pivoted on the board 70 and at one end has a projection 105 which lies in the path of an adjustable screw stop 106 on the lever 100. The other end of the lever 104 is pivoted on a captive nut 99 on a screw spindle 107 adapted to be rotated by the wheel 79.

On the underside of the board 70, the clutch knob 77 is connected to a lever 108 which in the position shown in Figure 11 keeps the lever 100 out of action and in the position shown in Figure 13 allows the lever 100 to act on the plate 88. By turning the wheel 79 the projection 105 may be arranged to stop the lever 100 in any one of a large number of positions. After this the plate 88 is free to move as if the lever 100 had not acted upon it.

For ease of adjustment and indexing shift 78 has been provided. The nut 99 is split with the two halves pivoted on a hinge piece 110. (See Figures 14 and 15.) The halves are biased together by means of a compression spring in a recess 111 around a screw 112 which is screwed into the lower half. When the shift 78 is lifted the halves separate and the nut 99 is freed from the spindle 107 for coarse adjustment of the position of the projection 105. The pointer on the shift may be accurately adjusted relatively to a scale 113 by means of the wheel 79.

In normal playing, i.e. the position shown in Figure 12, the arm 76 measures the size of the record about to be dropped on to the turntable and sets the abutment lever 80. At the appropriate point in the cam cycle the tone arm drops on to the edge of the record. With the indexing means of the invention in action (Figure 13) the projection 105 is set at such a position that the tone arm is forced under the action of the lever 100 to a position inside the periphery of the record. This position may be very accurately determined by the shift 78 and the wheel 79 relatively to the scale 113. All that is required is that the position of a given passage in a record be determined on the scale 113. Thus records may be sold with instructions of the scale reading on them or the reading may be gauged with a special gauge or the reading may be determined experimentally.

The invention has been described with reference to two known types of record changers, but almost any known type of record changer may be modified in a similar way by inhibiting the tone arm arresting mechanism and providing an indexing mechanism adapted to arrest the tone arm in lieu of the normal mechanism at a point radially inward of the normal arresting position. In the above two embodiments the changers are adapted to operate with standard sizes of records under normal conditions. The invention is very useful for playing records not of a standard size. In fact with the invention the size of the record within limits is immaterial.

Likewise the invention is applicable to record players which are not necessarily designed to play records in sequence from a stack. This is of some advantage to discomaniacs as precious records need not be stacked one on top of the other and the danger of scratching inherent in manual operation is eliminated.

Each of the modifications shown can easily be modified to become simply a record player. Thus in the embodiment of Figures 1 to 8 the spindle 23 need simply be fixed to the turntable and that part of the mechanism involved in dropping a record can be omitted. Likewise in finger 25 and its associated parts may be dispensed with. The clutch knob 26 and its associated parts may be eliminated and only the adjustable stop 58, which need not be movable vertically, is provided. The knob 27 then has marks showing the size of record and intermediate marks for indexing the tone arm to selected passages in a record. In this case the knob 28 is simply operated to initiate a cycle of operations involving a record already on the turntable. The setting of the knob 27 determines the position at which the tone arm will be automatically lowered in the known manner.

A similar modification is possible with the embodiment of Figures 9 to 15. In this case the arm 76 and its associated parts may be eliminated. The position at which the tone arm is dropped in the cycle of operations is determined by the point to which the lever 100 is allowed to move. The scale 113 will have appropriate marks to indicate standard sizes of records should it be desired to play a record right from its start.

With the embodiments of the invention described above, a passage on a record may be selected very accurately provided that the index figure of the passage is known. The index figure may be computed on an arbitrary scale, but it may conveniently be computed on an inch scale and related to record diameters. Thus in Figure 16 the control knob 27 is shown against a scale 130 marked off in this way. Each of the numerical markings represents one inch on a record diameter and therefore one half inch of the radial distance to which the tone arm moves. For ease of identification the standard record sizes have been shown bolder than the substandard passage positions. Any convenient system of subdivision may be followed between the inch markings.

In Figure 17 the scale 113 of the embodiment of Figures 9 to 15 is shown marked to an inch scale, i.e. each major subdivision on the sacle represents half an inch on the radial distance through which the tone arm moves. As shown the markings increase in size from left to right. In the actual embodiment illustrated, the markings should be from right to left, but the position illustrated in Figure 17 may easily be obtained by putting a left hand thread on the spindle 107.

In order to obtain at any instant visual inspection of the radial distance of the needle on the tone arm, the invention provides a gauge such as that shown in Figure 18. The gauge is drawn with the same scaled series as discussed with reference to Figures 16 and 17. Thus a reading on the gauge can easily be set on the controls of either of Figures 16 or 17. The user of a record may with the aid of the gauge compile his own index of the contents of a record.

The invention also contemplates that the record itself provides an index number to permit selection of a part of the recording, the number being of an appropriate scaled series, e.g. that described with reference to Figures 16 and 18. Such a record is illustrated in Figure 19.

We claim:

1. A record changer having automatic cycles for the sequential playing of a plurality of records, including a rotatable turntable, means for releasably supporting a stack of records above the turntable, means for dropping a record on the turntable during each cycle, a tone arm, tone arm actuating means to effect vertical swinging of the tone arm relatively to the turntable, swing means constrained to swing horizontally, means to constrain the tone arm and swing means to move horizontally with the tone arm towards the centre of the turntable, record selector means normally operable at the beginning of each cycle by a record being dropped on to the turntable, at least one abutment adapted to be preset by the record selector means in the path of the swing means to arrest horizontal swinging movement of the tone arm at the periphery of the record, manual indexing means including a manually adjustable stop capable of being preset to arrest horizontal swinging movement of the swing means at a radial distance smaller than the peripheral distance of the record and means to interchange the abutment and the manually adjustable stop as arrestors of the horizontal swinging movement of the tone arm.

2. The record changer claimed in claim 1 in which the indexing means includes second swing means to constrain the first swing means to continue swinging movement after contact with the abutment and the adjustable stop is preset in the path of the second swing means, so that the arresting action of the record selector means is subordinated to the arresting action of the indexing means.

3. The record changer claimed in claim 1 in which the interchanging means interchanges the manually adjustable stop and the abutment in the path of the swing means.

4. The changer claimed in claim 1 including a control knob for adjusting the stop and motion transmitting mechanism between the knob and the stop.

5. The changer claimed in claim 4 in which the knob is a wheel on a screwed spindle, and the motion transmitting mechanism includes a captive nut on the spindle.

6. The changer claimed in claim 5 including a pointer on the captive nut associated with a scale indicating the intermediate position to which the tone arm is indexed.

7. The changer claimed in claim 5 in which the captive nut comprises spring biased jaws clamping the spindle and means to open the jaws to enable the nut to be shifted without turning the spindle.

8. The changer claimed in claim 4 including a cog wheel on the control knob, a toothed quadrant co-operating with the cog wheel and motion transmitting mechanism from the quadrant to the adjustable stop.

9. A record changer having automatic cycles for the sequential playing of a plurality of records, including a rotatable turntable, means for releasably supporting a stack of records above the turntable, means for dropping a record on the turntable during each cycle, a tone arm, tone arm actuating means to effect vertical swinging of the tone arm relatively to the turntable, means for effecting a horizontal swinging movement of the tone arm, record selector means normally operable at the beginning of each cycle by a record being dropped onto the turntable to arrest horizontal swinging movement of the tone arm at the periphery of such record, indexing means capable of being preset to arrest horizontal swinging movement of the tone arm at a radial distance smaller than the peripheral distance of the record and to inhibit the arresting action of the record selector means to the extent that when the indexing means is operable it subordinates the arresting action of the record selector means to the arresting action of the indexing means, and means to render the indexing means operable.

10. A record changer having automatic cycles for the sequential playing of a plurality of records, including a rotatable turntable; means for releasably supporting a stack of records above the turntable; means for dropping a record on the turntable during each cycle; a tone arm; tone arm actuating means to effect vertical swinging of the tone arm relatively to the turntable; means for effecting a horizontal swinging movement of the tone arm, the latter means including a first lever associated with the tone arm, means connecting the tone arm and the first lever to constrain the tone arm to move with the first lever so that the tone arm moves towards the centre of the turntable with lost motion with the tone arm in the other direction of rotation of the lever and means urging the first lever to rotate in the former direction; record selector means normally operable at the beginning of each cycle by a record being dropped on to the turntable to arrest horizontal swinging movement of the tone arm at the periphery of such record, a stop preset by the selector means, the stop being in the path of the first lever; indexing means capable of being preset to arrest horizontal swinging movement of the tone arm at a radial distance smaller than the peripheral distance of the record, the indexing means including a second lever likewise having lost motion with the tone arm and constraining it to rotate in the same direction, means urging the second lever to rotate and a manually adjustable stop in the path of the second lever; and means to render the indexing means operable.

11. A record changer having automatic cycles for the sequential playing of a plurality of records, including a rotatable turntable; means for releasably supporting a stack of records above the turntable; means for dropping a record on the turntable during each cycle; a tone arm; tone arm actuating means to effect vertical swinging of the tone arm relatively to the turntable; means for effecting horizontal swinging movement of the tone arm; record selector means normally operable at the beginning of each cycle by a record being dropped on to the turntable to arrest horizontal swinging movement of the tone arm at the periphery of such record; at least one abutment adapted to be preset by the record selector means; swing means adapted to swing horizontally with the tone arm and adapted to be stopped by the abutment; a manually adjustable abutment adapted to be inserted in the path of the swing means; and means adapted to interchange the manually adjustable abutment and the abutment preset by the record selector means in the path of the swing means.

References Cited in the file of this patent

UNITED STATES PATENTS

| | | |
|---|---|---|
| 1,331,857 | Walthers | Feb. 24, 1920 |
| 2,494,063 | Simon | Jan. 10, 1950 |
| 2,511,708 | Hammond | June 13, 1951 |
| 2,576,125 | Lapish | Nov. 27, 1951 |
| 2,587,970 | Courtis | Mar. 4, 1952 |
| 2,610,062 | Bratton | Sept. 9, 1952 |
| 2,616,705 | Leonard | Nov. 4, 1952 |
| 2,752,159 | Bacher | June 26, 1956 |
| 2,763,486 | Dobrogowski et al. | Sept. 18, 1956 |
| 2,823,039 | Collaro et al. | Feb. 11, 1958 |
| 2,845,272 | Kamler | July 29, 1958 |